United States Patent [19]

Berwick

[11] Patent Number: 5,317,811
[45] Date of Patent: Jun. 7, 1994

[54] APPARATUS AND METHOD FOR MEASURING SURFACES AND LENSES

[76] Inventor: Peter R. Berwick, 5 Valley Road, Wotton-Under-Edge, Gloucestershire GL12 7NP, England

[21] Appl. No.: 956,067

[22] Filed: Oct. 2, 1992

[51] Int. Cl.⁵ .............................................. G01B 5/22
[52] U.S. Cl. ........................................ 33/507; 33/533; 33/546; 33/552
[58] Field of Search ................. 33/200, 507, 533, 546, 33/549, 551, 552, 555, 557, 560, 531, 836

[56] References Cited

U.S. PATENT DOCUMENTS

| 2,642,670 | 6/1953 | Dow ........................................ 33/531 |
| 3,479,744 | 11/1969 | Howland et al. . |
| 4,403,420 | 9/1983 | Rarick .................................... 33/507 |
| 5,131,159 | 7/1992 | Takahashi et al. . |

FOREIGN PATENT DOCUMENTS

| 4023757 | 2/1991 | Fed. Rep. of Germany . |
| 0020889 | 9/1969 | Japan ..................................... 33/507 |
| 53-69665 | 6/1978 | Japan . |
| 62-81518 | 4/1987 | Japan . |
| 0251603 | 11/1987 | Japan ..................................... 33/507 |
| 0278405 | 12/1987 | Japan ..................................... 33/551 |
| 62-278405 | 12/1987 | Japan . |
| 0097801 | 4/1989 | Japan ..................................... 33/507 |
| 0161305 | 6/1990 | Japan ..................................... 33/507 |
| 0268669 | 4/1970 | U.S.S.R. ............................... 33/552 |
| 1379591 | 3/1988 | U.S.S.R. . |

Primary Examiner—William A. Cuchlinski, Jr.
Assistant Examiner—Alvin Wirthlin
Attorney, Agent, or Firm—Longacre & White

[57] ABSTRACT

An apparatus containing four linear gauges (I, II, III and IV) allows simultaneous measurement of the main parameters of a lens blank, namely the vertex radius (or asphericity), the centre thickness, and the front surface sag. A first head member (6) presents contacts (12) which contact the front conicoid surface of a lens blank (101) on a first circle. A measuring head (8) presents contacts (13) on a second circle. Gauges (I and II) measure relative displacements between the contacts (12 and 13) and the end of pointer (3), from which the asphericity or vertex radius can be calculated. Gauges (III and IV) are coupled respectively to the rear and front surfaces of the lens blank (101). The perimeter (106) of the lens blank (101) is aligned with a reference plane (R). The displacements of the gauges (III and IV) can be used to calculate the centre thickness and front surface sag of the lens.

8 Claims, 9 Drawing Sheets

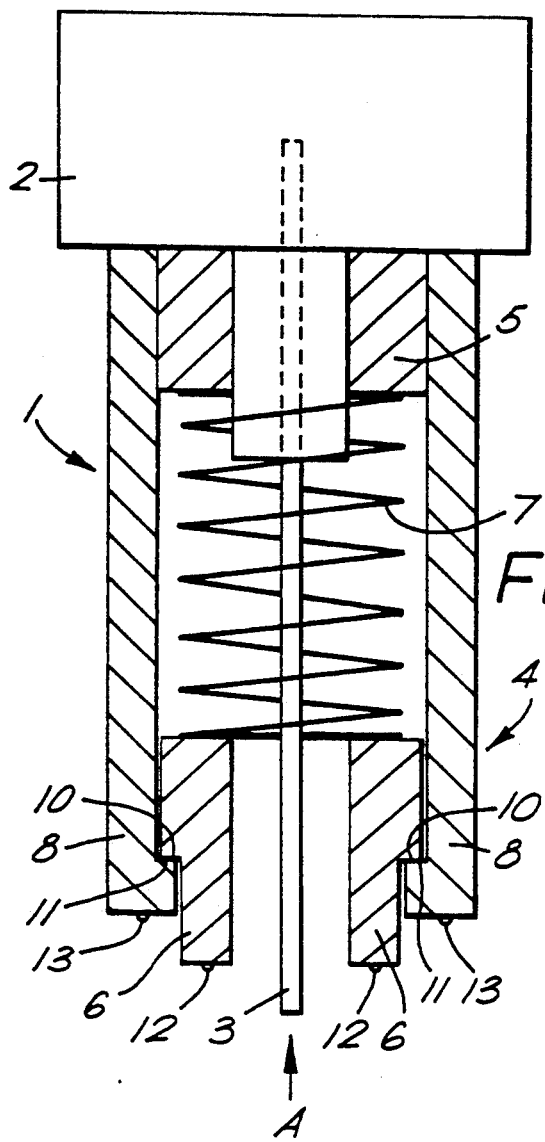
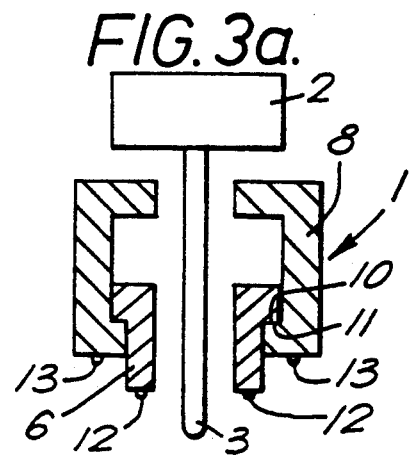
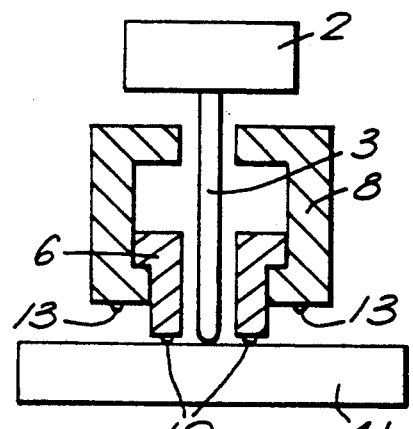
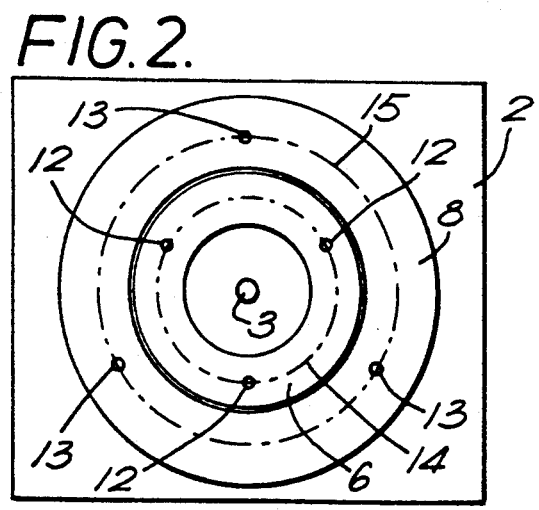
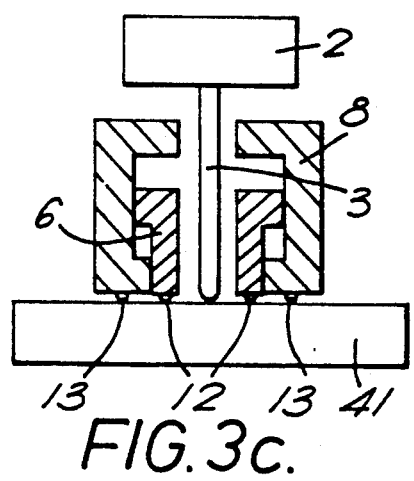

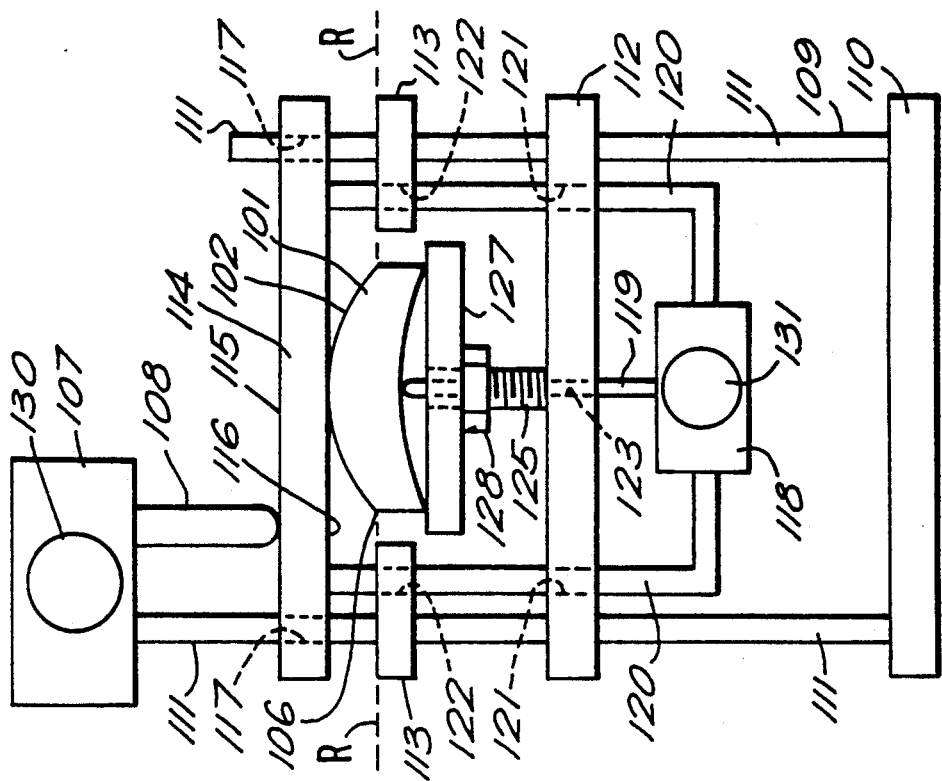
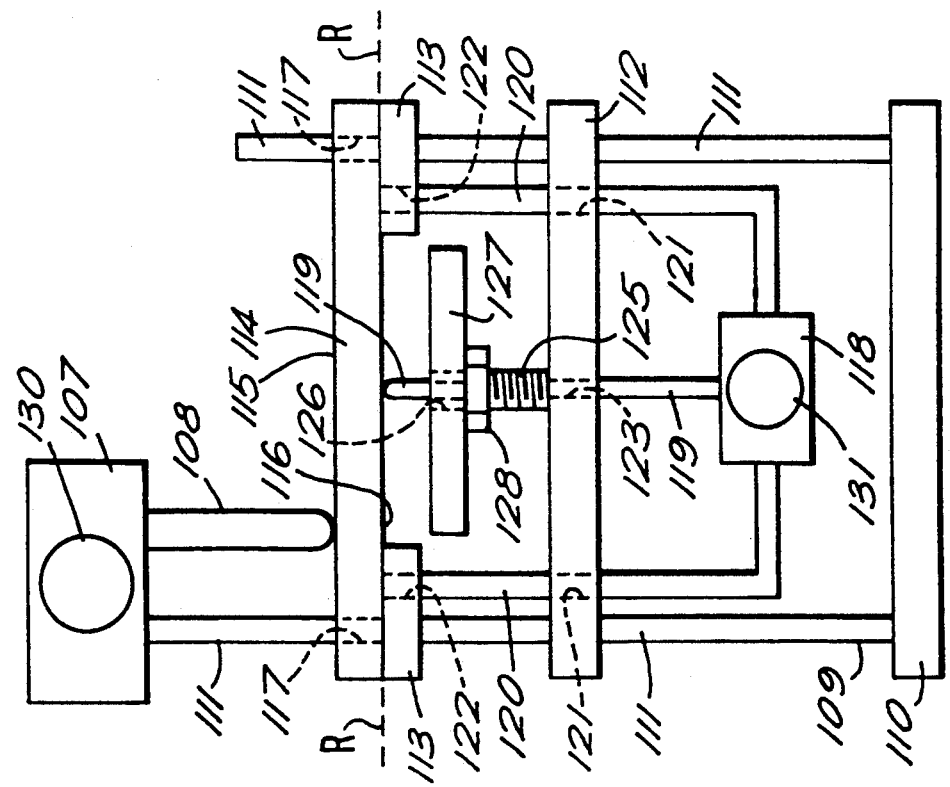

APPARATUS AND METHOD FOR MEASURING SURFACES AND LENSES

The present invention relates to an apparatus for and method of measuring a conicoid surface to determine a defining parameter of the surface, and in addition, or alternatively, for measuring various parameters of lenses. The invention has particular, though not exclusive, application in measuring conicoid lens surfaces and lens parameters. For example, the invention may be applied to conicoid surfaces forming part of either a spectacle lens or a hard or soft contact lens. The invention also relates to apparatus for measuring a lens of the type having a front, convex surface and a back, unfinished surface.

During the processing of lenses, for example spectacle lenses, it is necessary to make a number of measurements on semi-finished lenses, or lens "blanks". These blanks have one, finished, convex surface, and unfinished back surface. Measurements must be made on such a lens blank in order to determine the correct parameters for the back surface to give a finished lens the desired characteristics. For example, it is necessary to determine the power of the blank at the vertex of the convex surface. This involves making a measurement to determine the radius of the surface, where the surface is spherical, or the vertex radius where the convex surface is an aspheric surface. It is also necessary to determine the centre thickness of the lens, i.e. the thickness of the lens at the centre of the convex surface, and the "front surface sag". The front surface sag is the perpendicular distance between the centre of the convex surface and the plane containing the perimeter of the convex surface.

Where the convex surface is a spherical surface, the front surface sag can be calculated directly from the radius of the surface and the diameter of the perimeter of the convex surface. However, in the case of an aspheric surface, it is necessary to make additional measurements to determine reliably the front surface sag. This is especially so in the case of blended type surfaces where only the central portion may correspond to the true conicoid surface, and the edges follow other curves. In this specification a reference to an aspheric lens surface may include both a true conic surface and a blended-type surface.

Lenses with aspheric surfaces are increasingly being used in the manufacture of spectacle lenses since they are found to give better optical performance. Where large numbers of aspheric lens blanks are to be processed, it is desirable to enable the various lens parameters to be determined quickly and simply to give an overall efficient production process.

The radius of the spherical surface could be determined quite simply using a sagometer. This device utilises a digital linear gauge connected to a lens measuring head. The digital linear gauge has a depressible pointer, and gives a reading of the distance through which the pointer is depressed from a pre-set "zero" or reference position. The lens measuring head has two contacts for contacting the lens surface disposed one on either side of, and in line with, the tip of the pointer of the linear gauge. Some heads have three contacts arranged as the vertices of an equilateral triangle. In order not to damage the lens surface, the contacts of the measuring head consist of spherical steel balls. In use, the pointer of the linear gauge is accurately aligned with the contacts using an optically flat surface, and the linear gauge is "zeroed" with the pointer in this position. The pointer is then aligned with the vertex of the spherical lens surface, and depressed until the contacts of the measuring head contact the lens surface. A reading is taken from the linear gauge of the distance by which the pointer has been depressed. If c is the radius of the spherical contacts of the measuring head, 2b the centre-to-centre separation of the two contacts (or in the case of a three contact head, the diameter of the circle on which the contacts lie), and a the reading taken from the linear gauge, it can be shown that the radius of the spherical surface is given by:

$$r = \frac{a^2 + b^2}{2a} - c$$

Thus, where the convex surface of the lens is a spherical surface, it is a simple matter to determine the radius and therefore the power of the surface, and hence the correct parameters for the back surface of the lens to give the desired characteristics of the finished lens.

Lenses with conicoid surfaces, i.e. ellipsoidal, paraboloidal, or hyperboloidal surfaces, are being increasingly used in the manufacture of spectacle lenses. Lenses with conicoid surfaces are found to give better optical performance and improved vision for the wearer. As before, in order to determine the correct parameters for the back of such a conicoid lens blank to give the desired finished lens, it is necessary to determine the power of the finished conicoid surface at its vertex, the power at this point being unique, i.e. unlike the spherical surface the power will be different at other points on the surface.

The general equation of a conic curve can be expressed in the form:

$$px^2 - 2r_0x + y^2 = 0$$

where p is the asphericity, $r_0$ is the vertex radius, and (x, y) are the coordinates of a general point on the curve when the vertex of the curve passes through the origin of coordinates. In order to calculate the power of a conicoid surface of a lens at the vertex of the surface, it is necessary to determine either p or $r_0$. It will be seen from the equation of a conic curve given above, that in order to determine p or $r_0$, it is necessary to determine the coordinates $(x_1, y_1)$ and $(x_2, y_2)$ of any two points lying on the curve.

The problem faced by lens manufacturers is that there is no simple device currently available to enable them to measure either the asphericity or the vertex radius of a conicoid surface produced on a blank. If a conicoid surface is measured as previously described using a sagometer, then the values of a and b give the coordinates (a, b) of one point on the conic curve through the vertex, but this is insufficient to define the curve and enable a value for the asphericity or vertex radius of the curve to be determined. The sagometer can therefore only measure the radius of a spherical surface.

One instrument currently available for measuring conicoid surfaces uses a stylus linked to computer. The stylus takes about 600,000 measurements across the whole of the conicoid surface, and the computer maps the topography of the entire surface. This instrument can then check the defining parameters p, $r_0$ provided that the equation of the curve is known. If the equation is not known then the instrument uses a "best fit" technique to find the nearest conic curve. This instrument is complex and expensive.

In practice, when lens blanks are supplied to lens manufacturers, the box containing a blank carries a radius measurement for the conicoid surface of the blank, but this radius is measured using a sagometer. The radius given is therefore that measured as if the lens had a spherical surface and is not the true vertex radius of the conicoid surface. In view of this discrepancy, look-up charts are provided which give, for the value of the radius stated on the box, the correct parameters for the back surface of the lens in order to give the correct final power of the finished lens, provided that it is produced to a specified, non-variable, finished edge substance. These charts have often been found unreliable in practice.

It will be appreciated from the above that there is at present no simple device to enable direct determination of the defining parameters, i.e. the vertex radius or asphericity, of a conicoid lens blank in the workshop. The present invention seeks to enable such measurements to be made, so that a lens of any edge substance can be produced to the correct final power.

According to the present invention there is provided apparatus for measuring a conicoid surface to determine a defining parameter of the surface, which apparatus comprises means for contacting the surface on a first circle and for measuring the perpendicular distance between the vertex of the surface and a first plane related to the first circle, and for contacting the surface on a second circle and for measuring the perpendicular distance between the vertex and a second plane related to the second circle.

The said first and second planes may actually contain the first and second circles respectively. Alternatively, however, each plane may be slightly shifted from the plane of the corresponding circle. For example, each plane may be defined by points on the apparatus (such as the centres of spherical contacts) to be parallel to the plane containing the corresponding circle when the apparatus contacts a conicoid surface in use.

Since the apparatus contacts the surface on two circles, the apparatus enables two sets of coordinate points of the conic curve through the vertex of the surface to be determined. Thus, the asphericity and/or vertex radius of the surface can be determined.

By a conicoid surface is meant a surface formed by rotation of a conic curve about its major axis. By the vertex radius is meant a constant $r_0$ as defined by the general equation of the conic curve of the conicoid surface in the form:

$$px^2 - 2r_0x + y^2 = 0$$

where p is a constant and (x,y) are the coordinates of a general point on the curve when the vertex of the curve passes through the origin of the coordinates.

By the asphericity of the conicoid surface is meant a constant p as defined by the general equation of the conic curve in the form:

$$px^2 - 2r_0x + y^2 = 0$$

where $r_0$ is a constant and (x,y) are the coordinates of a general point on the curve when the vertex of the curve passes through the origin of the coordinates.

The apparatus may take the form of a measuring head including a connector for connecting the head to a linear gauge. If the measuring head is then attached to an existing linear gauge, a lens manufacturer, for example, can make direct measurements of the conicoid surface of a lens to determine the vertex radius/asphericity and hence the correct parameters for the back of the lens to produce the desired overall power of the finished lens.

Alternatively, the apparatus may take the form of one or more linear gauges and a measuring head connected together. In this case, the apparatus may include means for recording the results of measurements made by the linear gauge. This may be achieved, for example, by slight modification of an existing linear gauge to allow the gauge to record the results of measurements. Further, the apparatus may be adapted to process the results of measurements made by the linear gauge to produce an output in dependence upon the purpose of the measurements. For example, such apparatus for use in the lens industry may be adapted to display a value for the vertex radius/asphericity of a conicoid lens surface after measurements of the lens surface have been made.

The apparatus may include interface means for connecting the apparatus to a computer in use. In this case, the results of measurements made by the linear gauge may be processed by a computer in dependence upon the purpose of the measurements. For example, the computer may process the results of measurements to provide a value of the power at the vertex of a conicoid surface of a lens.

Turning now to preferred features of this aspect of the invention, it may be arranged in a preferred form that the said contacting and measuring means comprises a first head member for contacting the conicoid surface on the first circle, and a second head member for contacting the conicoid surface on the second circle, the first head member being moveable relative to the second head member in a direction which is substantially perpendicular to respective planes containing the first and second circles. It may be arranged that the first head member includes contacts for contacting the surface at at least three points spaced apart at substantially equal separations on the first circle, and the second head member includes contacts for contacting the surface at at least three points spaced apart at substantially equal separations on the second circle.

Preferably, the said contacting and measuring means comprises a first linear gauge having a pointer which is moveable relative to the gauge for measuring displacement of the pointer relative to the gauge, the gauge being mounted for contact of the pointer with the vertex of a conicoid surface at a point concentric with the said two circles. Preferably, the said contacting and measuring means comprises a second linear gauge having a pointer which is moveable relative to the gauge for measuring displacement of the pointer relative to the gauge, the gauge being mounted to be fixed in operation relative to the second head member and to present the pointer for contact with a surface of the first head member, whereby displacement of the first pointer relative to the first head member is measurable by the first gauge, and displacement of the first head member relative to the second head member is measurable by the second gauge.

The first head member is preferably mounted for sliding movement in the said direction relative to the second head member, the arrangement being such that relative movement of the head members other than in the said direction is prevented or inhibited. For example, the head members may comprise respective cylinders, mounted coaxially one inside the other, the outer surface of the inner cylinder being slidable against the inner surface of the outer cylinder.

In accordance with the invention in a further preferred aspect, the apparatus may be adapted for measuring various parameters of a lens having a front, convex surface and a back surface, the apparatus comprising two linear gauges each having a pointer which is moveable relative to the gauge for measuring displacement of the pointer relative to the gauge, means for defining a reference plane, and support means for supporting a lens to be measured, the support means being moveable relative to the reference plane to enable a plane defined by the lens to be arranged coincidentally with the reference plane, the gauges being mounted so that the pointers thereof may be coupled in used to front and back surfaces of the lens, whereby when the said plane of the lens is brought into coincidence with the said reference plane, the pointers are displaced from zero positions by displacements from which parameters of the lens may be calculated.

Conveniently the apparatus includes a contact member arranged to contact a pointer of one of the gauges and arranged to be coupled to the convex front surface of the lens being measured in use, the contact member being moveable relative to the reference plane and in such movement being arranged to displace the pointer of the said one gauge. The zero position of the pointer of the said one gauge is conveniently defined by coincidence of the contact member or a chosen part thereof with the reference plane. The reference plane may be a plane containing the perimeter of the convex front surface of the lens, and the displacement of the pointer of the said one gauge may be used to measure the front surface sag of the lens.

Conveniently the other of the said two gauges is fixed relative to the contact member and the pointer of the said other gauge is positioned to contact the centre of the back surface of the lens in use. The zero position of the pointer of the said other gauge may be defined by coincidence of the tip of the pointer with the reference plane, and the displacement measured by the said other gauge may be used to measure the centre thickness of the lens. By the centre thickness of the lens is meant the distance between the front and rear surfaces of the lens taken at the apex of the convex front surface of the lens.

In a particularly preferred form, the said contact member is arranged to be coupled to the convex front surface of the lens by way of the said contacting and measuring means referred to in connection with earlier aspects of the invention.

Preferably, the reference plane is horizontal in use and the contact member is coupled to the lens in use so as to rest under the influence of gravity directly or indirectly against the convex surface of the lens in use. Also preferably the reference plane is defined by a reference member, the contact member resting by gravity directly or indirectly against the reference member during zeroing of the gauges.

The contact member preferably comprises a plate which rests under the influence of gravity against the convex surface of the lens in use. This obviates the need to fix the contact member in its position in contact with the convex surface of the lens to ensure accuracy of the measurements. In this case, the reference plane may be defined by one or more reference plates which support the contact member prior to location of the lens on the support means.

Coincidence of the said plane defined by the lens with the reference plane may be judged by the eye in use. Alternatively, the apparatus may include means for detecting coincidence of the reference plane and the plane defined by the lens.

Where aspects of the invention have been set out with reference to an apparatus, there may also be provided in accordance with the invention a corresponding method, and vice versa. Also, many of the preferred features set out above, may be provided independently in accordance with an apparatus and/or method of the invention.

In particular there may be provided a measuring head for a linear gauge, which head comprises connecting means for connecting the head to a linear gauge having a pointer which is moveable relative to the gauge for measuring displacement of the pointer relative to the gauge, two or more contacts for contacting a conicoid surface to be measured, and mounting means for the contacts, the mounting means being adapted to present the contacts on first and second circles of different diameters lying in spaced apart planes and concentric with the position at which the tip of the pointer lies when the measuring head is connected to the gauge by the connecting means.

In accordance with a further aspect of the invention there may be provided apparatus for measuring a lens having a front, convex surface and a back surface, the apparatus comprising two linear gauges each having a pointer which is moveable relative to the gauge for measuring displacement of the pointer relative to the gauge, means for defining a reference plane, and support means for supporting a lens to be measured, the support means being moveable relative to the reference plane to enable a plane defined by the lens to be arranged coincidentally with the reference plane, the gauges being mounted so that the pointers thereof may be coupled in used to front and back surfaces of the lens, whereby when the said plane of the lens is brought into coincidence with the said reference plane, the pointers are displaced from zero positions by displacements from which parameters of the lens may be calculated.

In accordance with a yet further aspect of the invention there may be provided a method of determining a defining parameter of a conicoid lens surface, comprising measuring the perpendicular distance between the vertex of the surface and a first plane related to a first circle on the lens surface, measuring the perpendicular distance between the vertex of the surface and a second plane related to a second circle on the lens surface, and calculating the defining parameter from the measured distances.

In one form, it may be arranged that the said defining parameter of the conicoid surface is the vertex radius $r_0$, of the lens, as defined by the general equation of the conic curve of the conicoid surface in the form:

$$px^2 - 2r_0 x + y^2 = 0$$

where p is a constant and (x,y) are the coordinates of a general point on the curve when the vertex of the curve passes through the origin of the coordinates.

In another form, it may be arranged that the said defining parameter of the conicoid surface is the asphericity p as defined in the general equation of the conic curve in the form:

$$px^2 - 2r_0x + y^2 = 0$$

where $r_0$ is a constant and $(x,y)$ are the coordinates of a general point on the curve when the vertex of the curve passes through the origin of the coordinates.

In accordance with another aspect of the invention there may be provided a method of measuring a lens having a front, convex surface, and a back surface, comprising the steps of defining a reference plane, defining a zero position of one of two linear gauges, by reference to the reference plane, defining a zero position of the other of the two linear gauges, by reference to the reference plane, mounting a lens on a support means, coupling the pointer of the said one linear gauge to a front surface of the lens, coupling the pointer of a said other linear gauge to the rear surface of the lens, moving the lens until the reference plane coincides with a plane defined by the lens, and calculating a parameter of the lens from displacements of the pointers from the zero positions thereof.

In one form it may be arranged that the said defined plane of the lens is a plane containing the perimeter of the front convex surface, and the method includes calculating the front surface sag of the lens from the displacement of the first mentioned pointer relative to the reference plane, and calculating the centre thickness of the lens by reference to the displacement of the second mentioned pointer relative to the first mentioned pointer.

Embodiments of the invention will now be described, by way of example, with reference to the accompanying drawings in which:

FIG. 1 is a diagrammatic representation an embodiment of lens measuring apparatus in accordance with a first aspect of the invention;

FIG. 2 is a view in the direction of the arrow A in FIG. 1;

FIGS. 3a, 3b and 3c are simplified representations of the apparatus of FIG. 1 at successive stages during calibration of the apparatus;

FIG. 10 is a diagrammatic representation of lens measuring apparatus embodying the invention, set up in a zeroing mode;

FIG. 11 is a diagrammatic representation of the apparatus of FIG. 10, set up in a lens measuring mode;

Figure 4A:
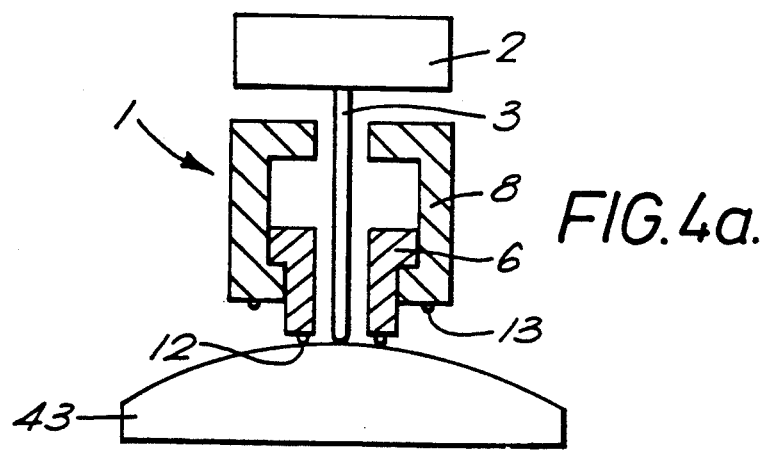
FIGS. 4a and 4b are simplified representations of the apparatus of FIG. 1 at successive stages during measurement of a conicoid lens.

With reference to FIG. 1, lens measuring apparatus, embodying the invention in a first aspect indicated generally at 1, comprises a digital linear gauge 2 having the usual depressible pointer 3. A lens measuring head, indicated generally at 4, is connected to the linear gauge by a connecting collar 5 of the measuring head 4.

The measuring head 4 comprises a first, generally cylindrical, head member 6 connected to the collar 5 by a compression spring 7. A second, generally cylindrical, head member 8 is rigidly connected to the collar 5 so as to extend coaxially with the first head member 6. The axis of the head members 6, 8 coincides with the longitudinal axis of the pointer 3 of the linear gauge 2.

The first, or inner, head member 6 is movable relative to the second, or outer, head member 8 in the direction of the axis of the head members and the pointer 3 of the linear gauge by applying force to the inner head member 6 so as to compress the compression spring 7. The outer cylindrical surface of the inner head 6 slides against the inner cylindrical surface of the outer head 8 during this movement. A step-like abutment 10 is provided on the inner head member 6 to abut with a corresponding shoulder 11 on the outer head member 8, thereby limiting the movement of the inner head member relative to the outer head member.

The inner head member 6 extends beyond the outer head member 8 in a direction towards the tip of the pointer 3 of the linear gauge. As is most easily seen in FIG. 2, the inner head 6 and outer head 8 each have three contacts 12, 13 thereon for contacting a lens surface in use. The contacts 12 on the inner head and the contacts 13 on the outer head are substantially equally spaced around the inner and outer head respectively. The contacts 12 on the inner head define points on a first circle 14, and the contacts 13 on the outer head define points on a second circle 15. The contacts 12, 13 consist of spherical steel balls to avoid the risk of damaging the lens surface in use.

Use of the measuring apparatus 1 will now be described with reference to FIGS. 3a, 3b, 3c and 4a and 4b.

FIG. 3a shows a simplified representation of the apparatus of FIG. 1 with the compression spring 7 and connecting collar 5 having been omitted for clarity. When no external forces are applied, the apparatus is as shown in FIG. 3a, the abutment 10 on the inner head 6 being in contact with the shoulder 11 on the outer head 8. The abutment 10 and shoulder 11 thus define a reference position of the inner head 6 relative to the outer head 8.

With the inner head 6 in this reference position, the apparatus is pressed against an optically flat test plate 41 so that the pointer 3 of the linear gauge 2 is depressed until the contacts 12 on the inner head 6 just contact the test plate, as shown in FIG. 3b. The linear gauge is then zeroed in this position. To guard against unintentional compression of the spring 7 when the contacts 12 contact the test plate 41, and therefore inaccurate zeroing of the gauge relative to the reference position of the head members, it may be necessary or desirable to provide a fixing device for fixing the inner head 6 in its reference position. For example, a screw may be provided which extends through the outer head 8 and registers with a bore in the inner head 6 when the inner head is in its reference position.

After zeroing of the linear gauge, the apparatus is pressed further towards the surface until the contacts 13 on the outer head 8 contact the test plate 41. The reading shown on the linear gauge is then a direct measurement of the perpendicular distance between the contacts 12 on the inner head and the contacts 13 on the outer head. This reading is then recorded. Let this reading be d.

To determine the vertex radius of a conicoid lens surface, the pointer 3 of the linear gauge 2 is aligned with the vertex of the conicoid surface, and the apparatus is pressed against the surface until the contacts 12 on the inner head 6 just contact the conicoid surface of the lens 43 as shown in FIG. 4a. As before, it may be necessary or desirable to fix the inner head 6 in its reference position for this stage of the measurement. It will be appreciated that the contacts 12 on the inner head contact the lens surface on a first circle. The reading of the linear gauge then gives a direct measurement of the perpendicular distance between the plane containing this circle and the vertex of the lens. Let this reading be $x_1$.

Figure 4B:
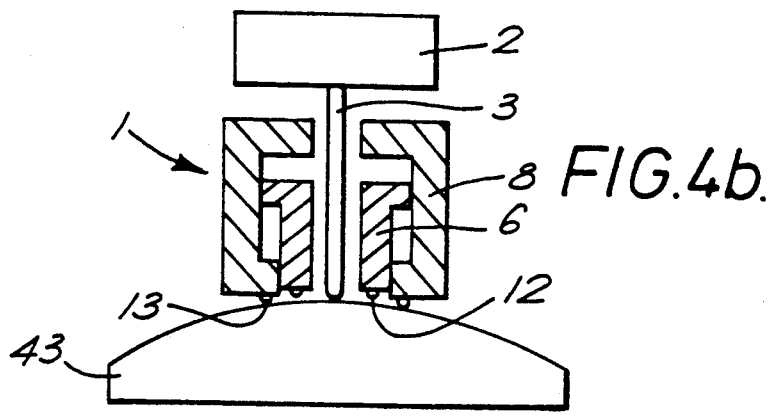

The apparatus is then further pressed towards the lens until the contacts 13 on the outer head 8 contact the lens surface as shown in FIG. 4b. During this step, the inner head 6 remains in contact with the lens surface and slides relative to the outer head 8 resulting in compression of the spring 7. Clearly, if the inner head 6 was initially fixed in its reference position, the fixing means must be released prior to this step.

In the position shown in FIG. 4b, the contacts 13 of the outer head 8 contact the lens surface on a second circle of larger diameter than the first circle. The reading of the linear gauge is then recorded. If the perpendicular distance between the vertex of the lens surface and the plane containing the second circle is $x_2$, the reading shown on the linear gauge is $d+x_2$.

Figure 5:
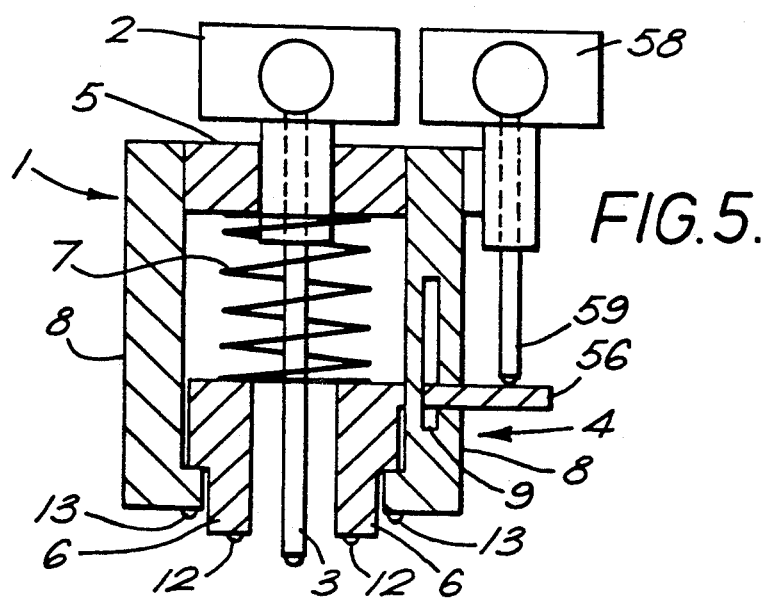
FIG. 5 is a diagrammatic representation of a modified embodiment of apparatus in accordance with the first aspect of the invention.

FIG. 5 shows a modified, preferred, form of the lens measuring apparatus 1. An extension arm 56 of the inner head 6 protrudes through a vertical slot 9 in the outer head 8. The arm 56 activates the depressible pointer 59 of an auxiliary linear gauge 58.

Figure 6:
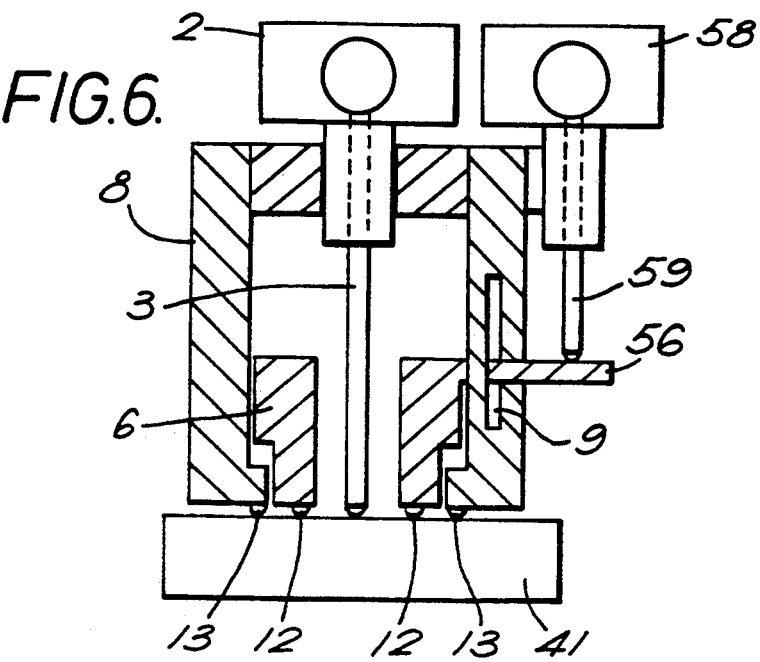
FIGS. 6 and 7 are simplified representations of the apparatus of FIG. 5 during calibration and in use respectively.

Referring to FIG. 6, to calibrate the apparatus, an optically flat test plate 41 is pressed against the apparatus depressing first the pointer 3 of the main gauge 2, then the inner head 6, which depresses the pointer 59 of the auxiliary gauge 58 by means of the extension arm 56, until the surface comes into contact with the contacts 13 of the outer head 8. The measuring heads now both lie in the same plane and both linear gauges 2, 58 are now zeroed.

Figure 7:
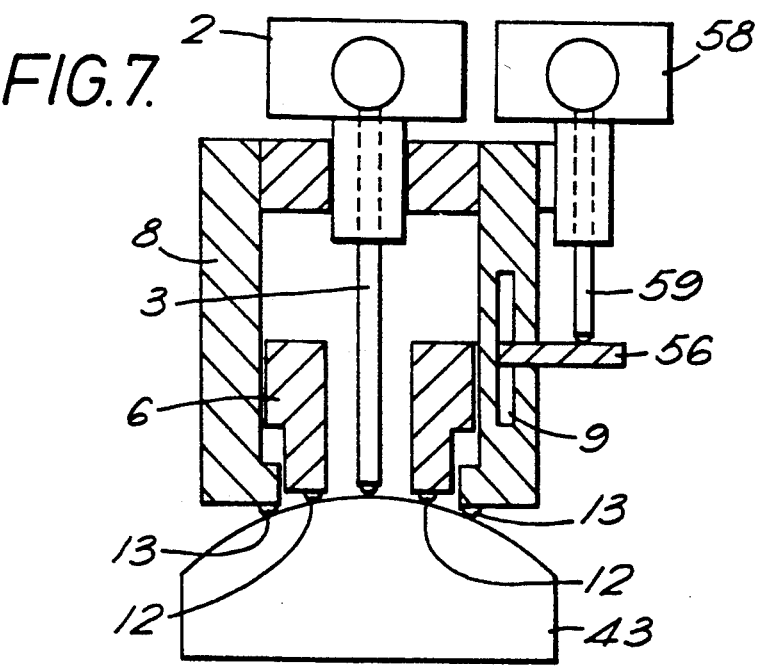

Referring to FIG. 7, in use a conicoid surface 43 is pressed against the apparatus until it comes into contact with the contacts 13 of the outer head 8. The action of the spring 7 (not shown in FIGS. 7 and 8) maintains contact between the contacts 12 of the inner head 6 and the conicoid surface 43. The main gauge 2 now reads directly the value $x_2$ and the auxiliary gauge 58 now reads the difference between the values $x_2$ and $x_2$. Both readings can be electronically recorded and the instrument can then display either the vertex radius $r_0$ or the parameter p.

A method of calculating the vertex radius of the conicoid surface of the lens blank 43 from measurements made by the apparatus of the invention, will now be described with reference to FIG. 8.

Figure 8:
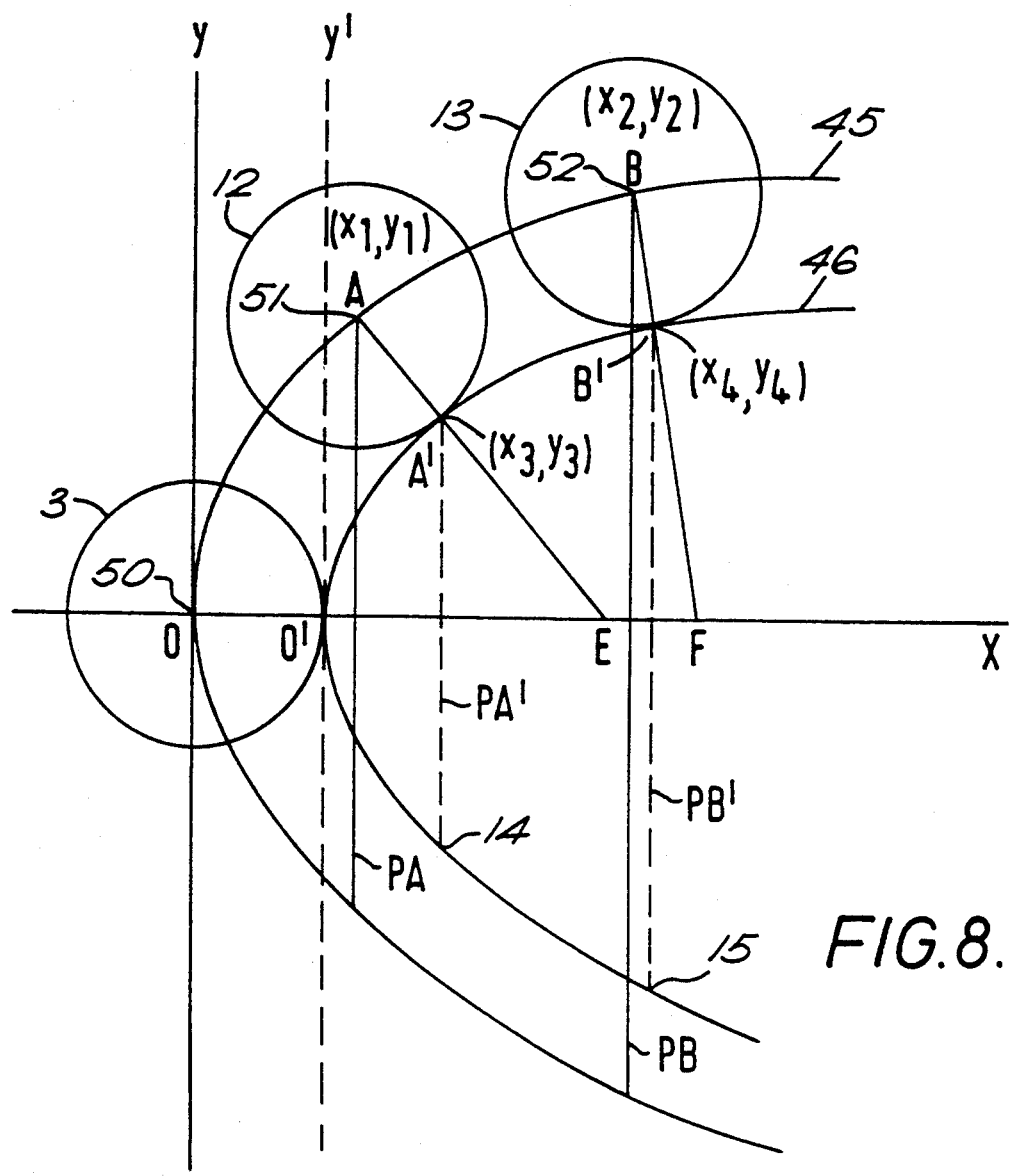
FIG. 8 is a diagram illustrating the relationships between the results of measurements made using the apparatus of the invention and the coordinates of points on the conicoid surface.

Referring to FIG. 8 and to FIG. 2, the point A' lies in a plane PA' containing the first circle 14 shown in FIG. 2. The point A lies in a plane PA which is related to the plane PA' containing the first circle 14. Similarly, the point B' lies in a plane PB' containing the second circle 15 shown in FIG. 2. The point B lies in a plane PB which is related to the plane PB' containing the second circle 15. The plane PA' is parallel to and spaced from the plane PA, the spacing being determined by the diameter of the tip ball 12, the position of the circle 14, and the shape of the curve 46. The spacing of the planes PB' and PB is determined similarly. The actual coordinates measured by apparatus are the coordinates of the points A and B, i.e. the displacements of the centres of the contacts 12 and 13 relative to the centre of the ball point of the probe 3. However, the required coordinates, of the points O, A' and B', can be calculated from the measured coordinates.

FIG. 8 shows a general conic curve 45 lying in the x-y coordinate plane and passing through the points O, A and B, these being respectively the centres of ball bearings forming the tips of the pointer 3 and the contacts 12 and 13 in the apparatus of the preceding figures. It is important to note that these ball bearings must be of the same size. Let the radius of these bearings be referred to as c. The measurements $x_1$, $x_2$ and the chord diameters over which they are taken, $2y_1$ and $2y_2$ must be referenced to the centres of the above mentioned bearings because it is only at these centre points that the values $y_1$ and $y_2$ are constant, i.e.: they are independent of the actual points of contact of the bearings on the surface being measured. FIG. 8 also shows a general conic curve 46 passing through the points O', A' and B', these being the points of contact between the outer surfaces of the above mentioned bearings and the actual conic surface of the lens blank 43 being measured. (The curvatures of the curves 45 and 46 have been exaggerated for clarity.) As has previously been described, the curves 45 and 46 are each given by the general equation:

$$px^2 - 2r_0x + y^2 = O$$

where p is the asphericity and $r_0$ the vertex radius of the curve.

The arrow 50 indicates the centre of the bearing of the pointer 3 when its outer surface is in contact with the vertex of the aspheric surface of the lens blank 43. The coordinates of the arrow 50 are (O,O) in FIG. 8. The arrow 51 indicates the centre of one of the contacts 12 of the inner head 6 when the outer surface of the contact rests at the point A' on the surface being measured. This point has coordinates $(x_1, y_1)$ where $x_1$ has been measured with the linear gauge as previously described, and $y_1$ is the radius of the circle 14 on which the centres of the contacts lie. The arrow 52 indicates the centre of one of the contacts 13 of the outer head 8 when the outer surface of the contact rests at the point B' on the surface being measured. This point has coordinates $(x_2, y_2)$ where $x_2$ has been measured with the linear gauge as previously described, and $y_2$ is the radius of the circle 15 on which the centres of the contacts lie.

Re-arranging the equation of the conic curve 45 gives:

$$p = \frac{2xr_0 - y^2}{x^2}$$

Thus, since p is a constant for the curve:

$$\frac{2x_1 r_0 - y_1^2}{x_1^2} = \frac{2 x_2 r_0 - y_2^2}{x_2^2}$$

Re-arranging this gives:

$$r_0 = \frac{(y_1 x_2)^2 - (y_2 x_1)^2}{2x_1 x_2 (x_2 - x_1)}$$

Rearranging the equation of the conic curve 45 gives:

$$r_0 = \frac{px^2 + y^2}{2x}$$

since $r_0$ is a constant for the curve:

$$\frac{px_1^2 + y_1^2}{2x_1} = \frac{px_2^2 + y_2^2}{2x_2}$$

Rearranging this gives:

$$p = \frac{x_2 y_1^2 - x_1 y_2^2}{x_1 x_2 (x_2 - x_1)}$$

Thus the vertex radius $r_0$ and the asphericity p can be determined for any given conic curve from the values $x_1, y_1, x_2$ and $y_2$. It will be noted from FIG. 8 that the points of contact between the conic surface 46 and the outer surfaces of the bearings belonging to the pointer 3 and the inner and outer heads (i.e. points O', A' and B') give rise to new x,y coordinates. It is these new coordinates that need to be found so that the parameters $r_0$ and p can be evaluated for the actual conic surface (46) being measured. Let these new coordinates be $x_3, y_3$ and $x_4, y_4$.

Referring to FIG. 8, the lines AE and BF are normals to the tangents at the points A and B respectively on the conic curve OAB. Since the equation of the curve OAB can be calculated from the known values of $y_1, y_2$ and the BF can be found. As the distances OO', AA' and BB' are constant and equal to the radius c of the ball bearings belonging to the pointer 3 and the contacts 12 and 13, the new x,y coordinates can be evaluated.

The following mathematical proof rests on the assumption that the lines AE and BF are also normals to the tangents at the points A' and B' on the conic curve 46. This will in fact be the case when both the curves are circles. In the case of other types of conic curve the normals to the two curves may not be exactly parallel. However, since the chord length over which the measurements are taken is small in proportion to the vertex radius of the surface being measured, this discrepancy will be limited to the order of seconds of arc and would only give rise to a practical error so small as to be completely negligible.

As the equation of the curve OAB is of the general form:

$$px^2 - 2rx + y^2 = 0 \text{ then:}$$

Gradient of line AE is given by:

$$g_1 = \frac{y_1}{r - px_1}$$

Gradient of line BF is given by:

$$g_2 = \frac{y_2}{r - px_2}$$

The x,y coordinates of the points A' and B' are then:

$$y_3 = y_1 - c \cdot \sin(\tan^{-1} g_1)$$

and $$x_3 = x_1 - c(1 - \cos(\tan^{-1} g_1))$$

and $$y_4 = y_2 - c \cdot \sin(\tan^{-1} g_2)$$

$$x_4 = x_2 - c(1 - \cos(\tan^{-1} g_2))$$

where $x_3$ and $x_4$ are measured from the origin Y'O'.

Thus, the vertex radius $r_0$ of the conicoid surface 46 of the lens blank 43 can be determined from the values $x_1, y_1, x_2, y_2$ and c. This enables the power of the lens surface to be determined and hence the correct parameters for the back of the lens blank can be calculated to produce a finished lens of the desired overall power.

If a lens measuring head of the invention is used with an existing, unmodified, linear gauge, then the readings of the linear gauge can be noted down for the purpose of later calculation of the vertex radius. However, it will be appreciated that a modified linear gauge may be provided which is capable of recording the measurements. The linear gauge could then display directly values of $x_1$ and $x_2$ after measurement, and/or give a direct reading of the vertex radius $r_0$ or asphericity p. Further, the linear gauge may be adapted for connection to further apparatus, for example a computer, for processing the results of measurements made by the linear gauge to produce a desired output.

It will be appreciated that many variations and modifications may be made to the specific embodiments described above without departing from the scope of the invention. For example, the contacts may be provided by the inner edges of the head members 6, 8. As a further example, the compression spring 7 of the lens measuring apparatus 1 may be replaced by a solenoid (not shown) having an inner tubular core connected to the inner measuring head 6. In this case, when the solenoid is energised, the inner core is forced out of the solenoid, so holding the inner head 6 in its reference position. When the solenoid is de-energised, the tubular core of the solenoid is freed, allowing the inner head 6 to move towards the linear gauge 2 so that the outer head 8 can contact the lens surface.

There will now be described, with reference to FIGS. 9, 10, and 11, a preferred embodiment of the invention in a second aspect for determining the centre thickness and front surface sag of a lens.

Figure 9:
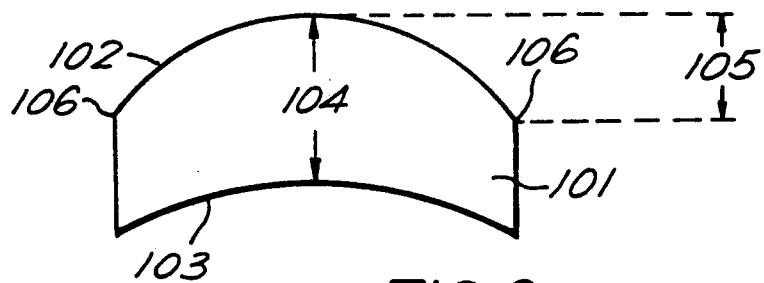
FIG. 9 is a diagrammatic cross-section of semi-finished lens.

FIG. 9 shows a cross-section through a semi-finished lens 101 having a front convex surface 102 and a back concave surface 103. The distance 104 between the centres of the surfaces 102, 103 is the centre thickness of the lens. The distance 105 between the centre of the convex surface 102 and the perimeter 106 of the convex surface is the front surface sag of the lens.

FIG. 10 shows apparatus embodying the invention for determining the centre thickness and front surface sag of the lens 101. The apparatus comprises a first digital linear gauge 107 having a first pointer 108. The gauge 107 is supported by a frame 109 so that the pointer 108 extends substantially vertically downwardly in use. The gauge 107 has a digital display 130 for indicating the displacement of the pointer 108 from a pre-set zero position.

The frame 109 comprises a base plate 110 and two upwardly extending support columns 111. A centre plate 112 extends horizontally between the support columns 111 to which the centre plate 112 is fixed. A reference plate 113 is fixed to each of the support columns 111 so as to extend horizontally in use. The plate 113 is a single rectangular plate with a central circular hole. The upper surface of the reference plate 113 defines a reference plane R with which the lens will be aligned in use as will be described hereinafter.

A contact member in the form of a movable top plate 114 rests by gravity on the reference plate 113. The pointer 108 of the gauge 107 contacts the upper surface 115 of the top plate 114. In the position shown, the lower face 116 of the top plate 114 coincides with the reference plane defined by the reference plate 113. The support columns 111 extend through corresponding holes 117 in the top plate 114 to allow the top plate 114 to be raised upwardly away from the reference plate 113. Upward movement of the top plate 114 depresses the pointer 108 of the linear gauge 107.

A further linear gauge 118, with a corresponding pointer 119, is fixed relative to the movable top plate 114 by means of support rods 120. The support rods 120 extend through corresponding holes 121 in the centre plate 112, and each rod 120 extends through a hole 122 in the reference plate 113. The pointer 119 of the gauge 118 extends vertically upwardly through a central hole 123 in the centre plate 112 to contact the lower face 116 of the top plate 114. Thus, the gauge 118 can move upwardly as the top plate 114 is raised, the support rods 120 and pointer 119 sliding through the holes 121, 122 and 123. The gauge 118 has a digital display 131 for indicating the displacement of the pointer 119 from a pre-set zero position.

The pointer 119 extends upwardly through a bore in a threaded shank 125 mounted on the centre plate 112. The upper portion of the shank 125 extends through a hole 126 in a support table 127 for supporting a lens. The table 127 is circular and is of slightly smaller diameter than that of the circular hole in the reference plate 113, so that the table 127 can pass through the hole in the reference plate 113. A screw-threaded nut 128 runs on the shank 125 and supports the support table 127. The height of the table 127 above the centre plate 112 can be adjusted by turning the nut 128 so that the nut runs up or down the shank 125. The pointer 119 of the gauge 118 extends through the table 127 to contact the lower face 116 of the top plate 114 as previously described.

The apparatus is used as follows. The linear gauges 107, 118 are zeroed with the apparatus in the configuration shown in FIG. 10, i.e. with the pointers 108 and 119 contacting the faces 115 and 116 respectively of the top plate 114, and the lower face 116 of the top plate coinciding with the reference plane defined by the upper surfaces of the reference plate 113. The top plate 114 is then raised manually, and (as shown in FIG. 11) the pointer 119 of the second gauge retracted, to allow the lens 101 to be placed on the table 127 with the convex surface 102 uppermost. The top plate 114 is then lowered until the lower face 116 rests against the convex surface of the lens 101, and the pointer 119 released so that it contacts the concave surface of the lens. The lens 101 is positioned on the table 127 so that the tip of the pointer 119 contacts the centre of the concave surface. Means (not shown) may be provided to assist correct placement of the lens 101 on the table 127. It is intended that the adjustable table will incorporate a centring device to facilitate correct placement of the lens blank prior to measurement.

The table 127 is then raised or lowered by turning the nut 128 until the perimeter 106 of the convex surface 102 coincides with the reference plane defined by the upper faces of the reference plate 113. This arrangement is shown in FIG. 11.

It can be seen from FIG. 11 that the displacement of the lower face 116 of the top plate 114 from the reference plane at this stage equals the front surface sag of the lens 101. Thus, the pointer 108 of the first gauge 107 is displaced from its zero position by a distance equal to the front surface sag, which is therefore displayed directly on the display 130. Further, since the pointer 119 of the second gauge 118 is displaced from the lower surface 116 of the top plate 114 by a distance equal to the centre thickness of the lens, the centre thickness is displayed directly on the display 131 of the gauge 118. Thus, the apparatus provides a simple mechanism for determining simultaneously the centre thickness and front surface sag of the lens.

The apparatus includes interface means (not shown) for connecting the gauges 107, 118 to a computer to allow the results of measurements made by the apparatus to be processed, along with the results of other measurements made on the lens, to determine the required parameters for the back surface of the lens to give a finished lens of the desired properties.

While coincidence of the perimeter 106 of the convex surface 102 with the reference plane may be judged by the eye, means, for example electronic means, may be provided for detecting the point of coincidence of the planes. As will be described hereinafter with reference to FIGS. 15a to 15f, the gauge may use electronic means to perform the following tasks:

(1) automatically adjust the table;
(2) detect the point of coincidence of the reference plane and the perimeter of the convex surface of the lens blank;
(3) rewind the table to a predetermined point in readiness for measuring the next blank.

For convenience, a lever mechanism may be provided to raise the top plate 114 and retract the pointer 119 of the gauge 118 to facilitate insertion of the lens.

Figure 12:
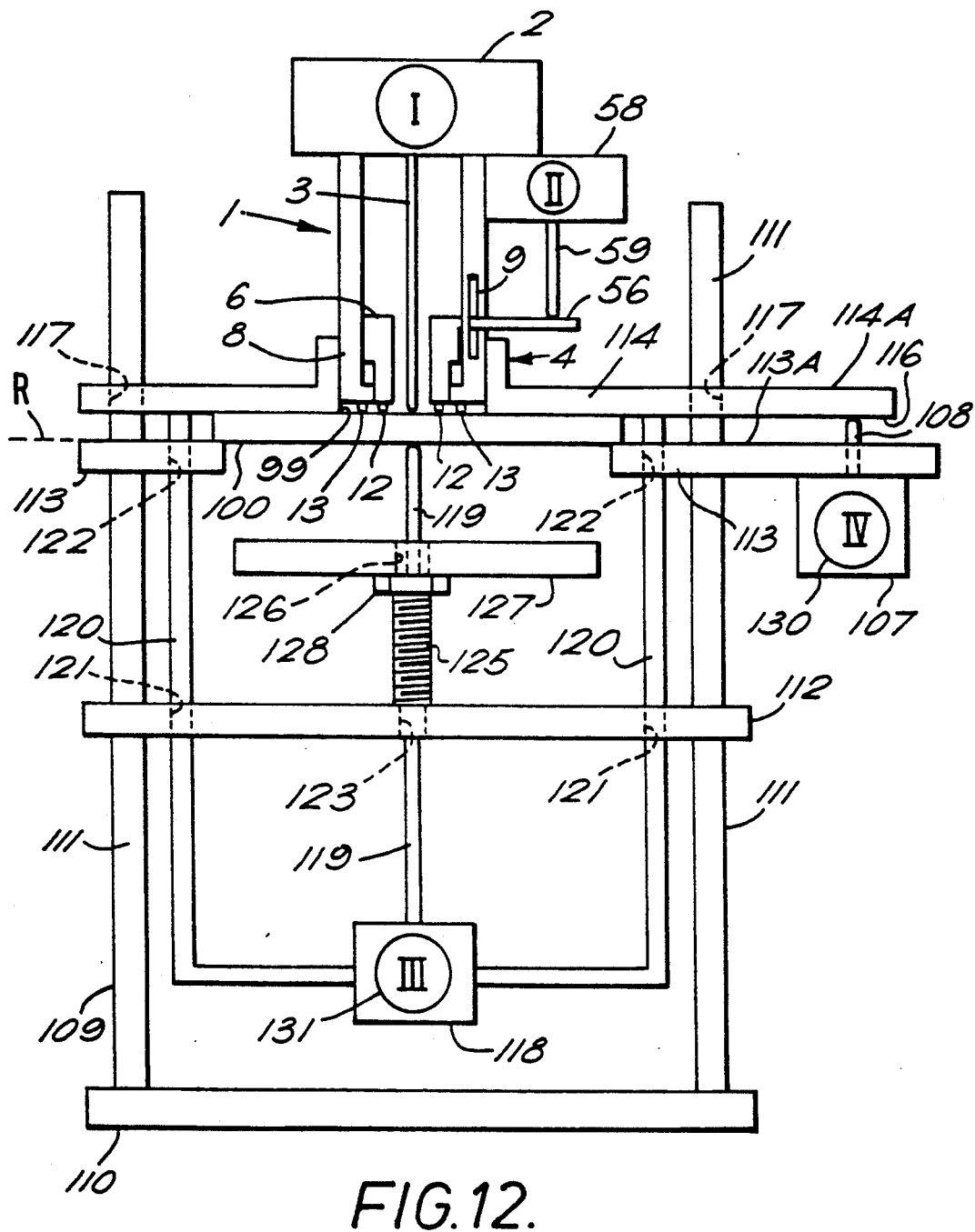
FIG. 12 is a diagrammatic representation of apparatus embodying the invention combining the embodiments of FIGS. 5 and 10, when set up in a zeroing mode.
Figure 13:
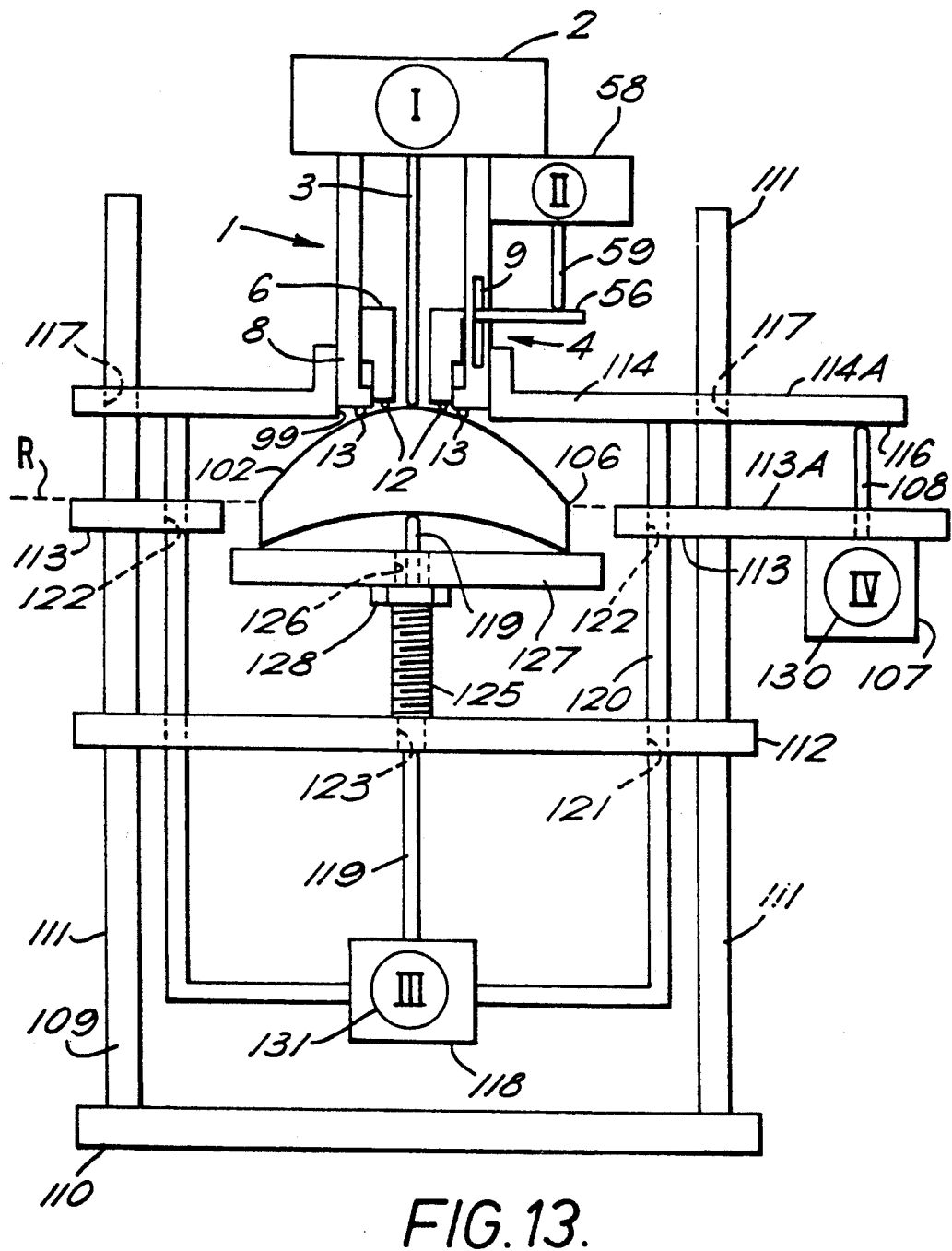
FIG. 13 is a diagrammatic representation of the apparatus of FIG. 12, when set up in a lens measuring mode.

There will now be described with reference to FIGS. 12 and 13 an apparatus embodying the invention in a most preferred form, in which the apparatus combines the features of the apparatus of FIG. 5 and the features of the apparatus of FIG. 10. The preferred form shown in FIG. 12 may be used to determine the vertex radius (or asphericity), and also the centre thickness and front surface sag of a lens. In FIG. 12 where components correspond to components used in previous figures, the components are referred to by like reference numerals.

Comparing the apparatus of FIG. 12 with that of FIG. 10 it will be seen that the gauge 107 has been moved from a position above the moveable top plate 114, to a position beneath the top plate 114. The gauge 107 is mounted on an extension 113A of the reference plate 113, and the pointer 108 of the gauge 107 rises vertically upwardly to contact the lower surface 116 of an extension 114A of the moveable top plate 114. Between the lower surface 116 of the top plate 114, and the upper surface of the reference plate 113 is positioned a test plate 100, used for zeroing purposes, as will be described hereinafter.

Set into an opening 99 in the top plate 114 is the entire apparatus 1 shown in FIG. 5, the head member 8 being fixedly secured relative to the top plate 114.

There will now be described the method of zeroing the apparatus of FIG. 12. To assist in the overall explanation, the four gauges 2, 58, 107 and 118, will now be referred to respectively as the first gauge (gauge I), the second gauge (gauge II), the third gauge (gauge III), and the fourth gauge (gauge IV).

The test plate 100 is rested on the top surface of the fixed reference plate 113 and the moveable top plate 114 is lowered to rest on the top surface of the test plate 100. The exact thickness of this test plate 100 (or zeroing plate) is known and remains a fixed parameter of the apparatus. The four linear gauges I, II, III and IV are now each set to zero. This may be done electronically by means of a computer interface. It can be seen from FIG. 12 that gauges I and II are both zeroed when the contacts 12, 13 and pointer 3 all lie in the same plane coincident with the plane containing the underside of the moveable top plate 114. Therefore, whichever position the moveable top plate is in, the two gauges I and II, directly make the respective measurements of $x_2$ (gauge I) and $x_2-x_1$ (gauge II). The contacts 13 of the outer head 8 are aligned to the underside of the top plate 114 at the point of manufacture of the gauge and thereafter remain fixed in this position.

Since gauge III is directly connected to the moveable top plate 114 by means of the support rods 120, its zero position can be set relative to the underside of the top plate 114 once an allowance for the thickness of the test plate 100 has been made. All subsequent readings from gauge III have to be modified to take account of the thickness of the test plate 100.

Gauge IV is attached to the fixed reference plate 113 and its zero position is set relative to the top surface of the fixed reference plate 113 once an allowance for the thickness of the test plate has been made. All subsequent readings from gauge IV will have to be modified to take account of the test plate thickness.

There will now be described an alternative method of zeroing. Gauge IV can be zeroed first by means of an auxiliary test plate (not shown) placed over the pointer of gauge IV and in contact with the top surface of the reference plate 113. In this position, gauge IV is then zeroed directly to the top surface of the reference plate 113 and no allowance for the test plate 100 thickness is necessary in subsequent readings. The original test plate 100 can then be used to zero gauges I, II and III as previously described. It will be realised that when this second stage of zeroing is done, the previously zeroed gauge IV now directly measures the thickness of the main test plate 100. This reading can be logged by a computer and used to modify the subsequent readings of gauge III. The advantage of this alternative method is that the actual thicknesses of the test plates are no longer required to be fixed parameters of the gauge and the use of any suitable test plates is now permissible.

There will now be described the use of the apparatus of FIGS. 12, 13 and 14 for measuring parameters of a lens. Referring to FIG. 13, the lens blank 101 is inserted and the moveable top plate 114 is lowered until the contacts 12 and 13 of the respective gauges I and II rest in contact with the convex front surface of the lens blank 101. The table 127 on which the lens blank 101 rests is then adjusted until the outer perimeter 106 of the front surface of the lens blank 101 is coincident with the uppermost surface of the fixed reference plate 113, i.e. lying in the reference plane R. With the lens blank in this position the following measurements are apparent:

(1) The vertex radius can be calculated from the readings of gauges I and II using the method and formulae described with reference to FIG. 8.

(2) The centre thickness is found by adding together the readings of gauges I and III and the test (zeroing) plate 100 thickness.

(3) The front surface sag is found by adding together the readings of gauges I and IV and the test (zeroing) plate 100 thickness.

If the alternative zeroing method is used then value (2) above is found by adding together the readings of gauges I and III and the logged reading of gauge IV at the second zeroing stage. Also, since gauge IV is now zeroed to the top surface of the fixed reference plate 113, the value (3) above is found simply by adding the readings of gauges I and IV.

Figure 14:
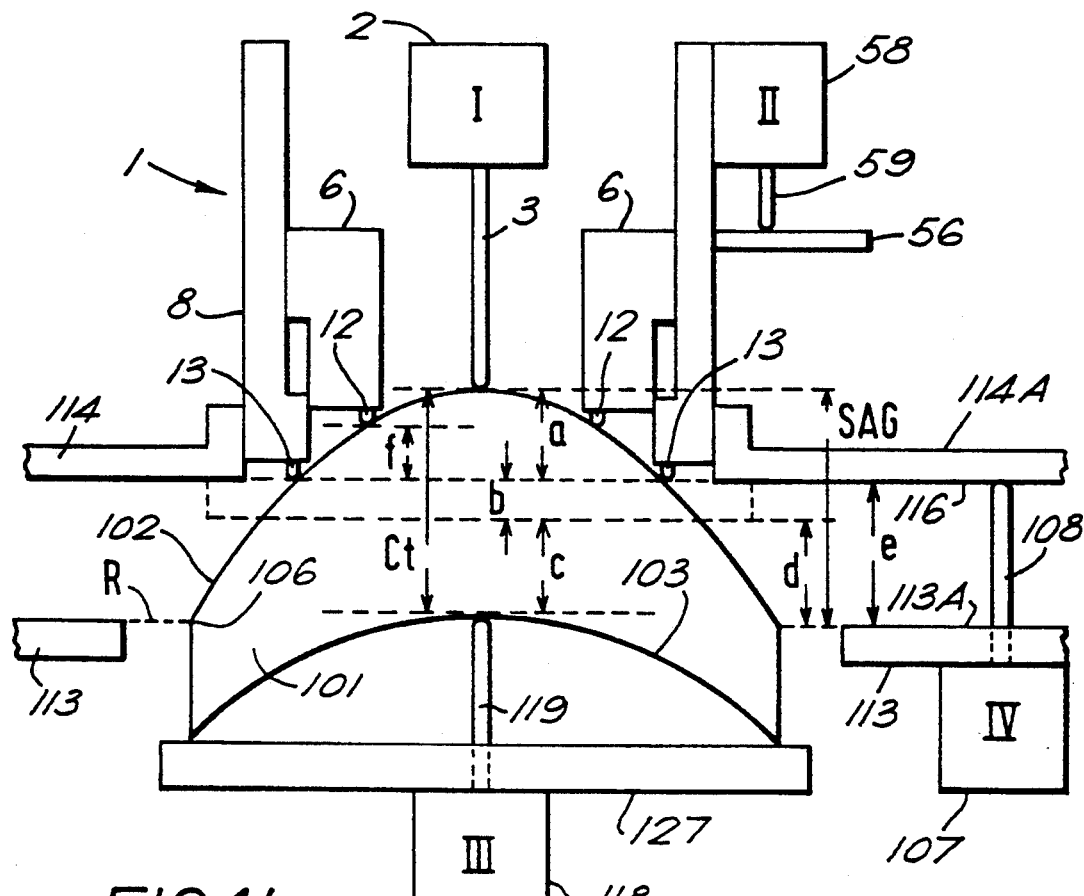
FIG. 14 is a diagrammatic representation showing the relationships between various measurements made by the apparatus of FIG. 12 and 13, and various parameters to be measured in accordance with the invention.

Referring to FIG. 14, the following measurements and distances are shown:

a = reading of gauge I;
b = thickness of test (zeroing) plate 100;
c = reading of gauge III;
d = reading of gauge IV when first zeroing method used;
e = reading of gauge IV when alternative zero method used;
f = reading of gauge II;
The vertex radius can be calculated from a and f.
ct = centre thickness = a+b+c,
sag = a+b+d or sag = a+e, depending on the zeroing method.

Figure 15A:
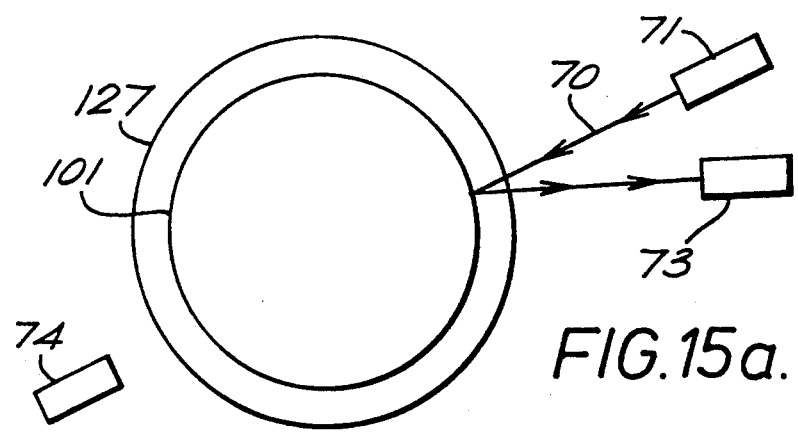
FIGS. 15a to 15f are diagrammatic representations of means for aligning various components of the apparatus embodying the invention set out in preceding Figures.
Figure 15B:
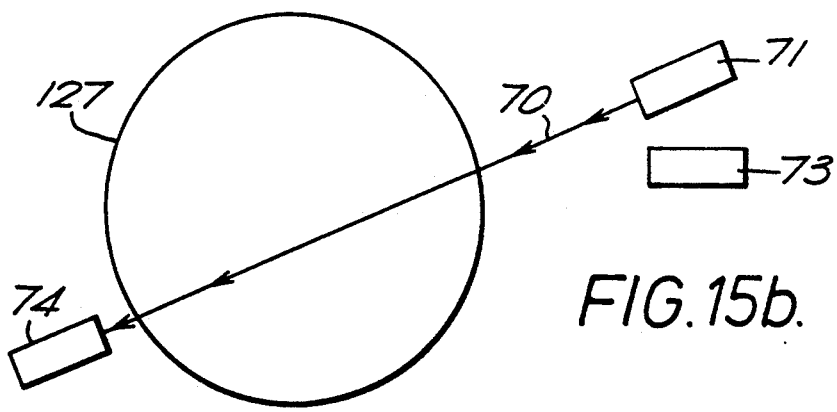
Figure 15C:
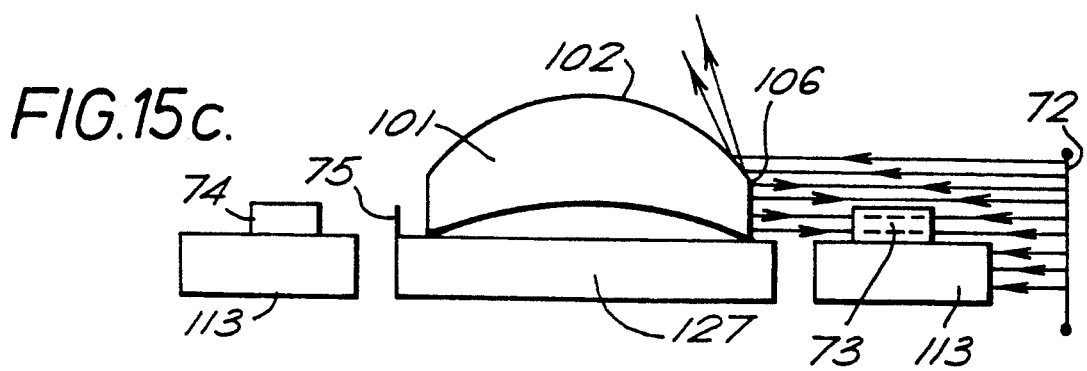

There will now be described, with reference to FIGS. 15a to 15f, methods of aligning various components within the apparatus. FIG. 15a shows a lens blank 101 in position on the adjustable table 127. A focused beam of light 70 is produced by means of a low voltage bulb 71 and a suitably powered lens. The bulb 71 has a straight element 72 (FIG. 15c) so that the beam of light produced is in the form of a vertical straight line. This beam 70 is directed across the top surface of the fixed reference plate 113 which therefore cuts off the lower part of the beam (FIG. 15c). The remainder of the beam is then reflected by the edge of the lens blank 101. It will be realised that the lowest point of this reflected beam is exactly level with the top surface of the fixed reference plate 113. The top part of this beam is lost because it is scattered by the polished convex surface 102 of the lens blank 101. The only part of the beam to be reflected is that which strikes the edge of the lens blank 101.

Figure 15D:
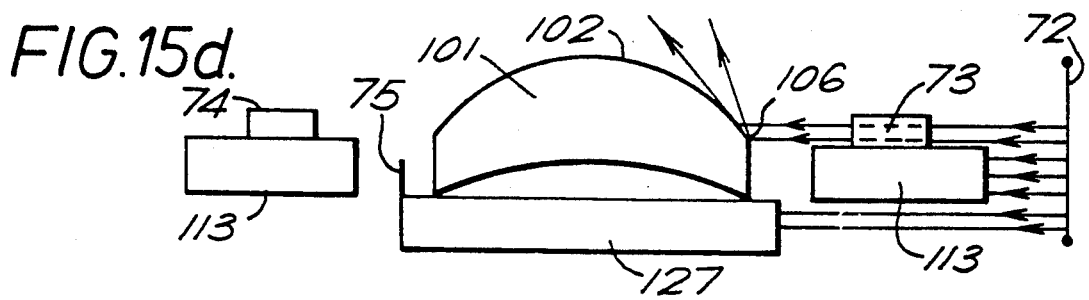

This reflected beam activates a photoelectric cell 73 (FIG. 15a) which, in turn, powers an electric motor (not shown) to wind down the adjustable table 127. As the table 127 and lens blank 101 are lowered, the extent of the beam 70 reflected at the blank edge is reduced. When the perimeter 106 of the convex surface 102 of the lens blank 101 is exactly level with the top surface of the reference plate 113 (FIG. 15d), none of the beam 70 is reflected towards the photoelectric cell 73 which then becomes deactivated. The electric motor stops and the table 127 with lens blank is now left in the desired position (FIG. 15d).

Figure 15E:
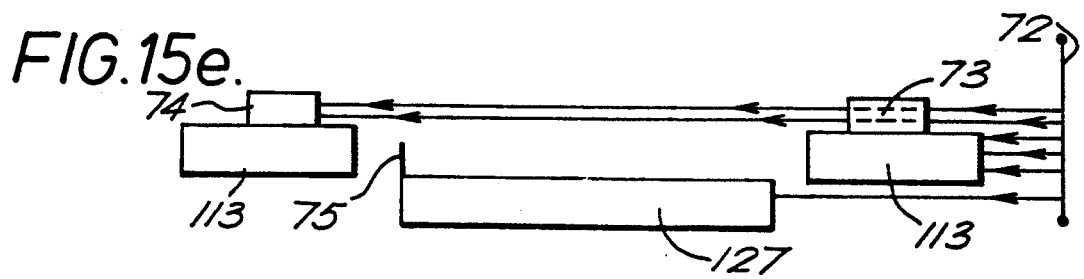
Figure 15F:
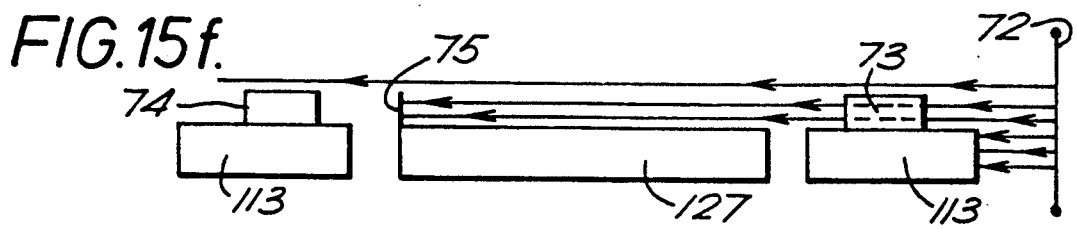

Diametrically opposite on the other side of the adjustable table 127 is a second photoelectric cell 74. When the lens blank 101 is positioned on the table 127, no light from the source 71 will be able to enter this second cell 74 (FIGS. 15a, 15c, and 15d). When the lens blank 101 is removed from the table, after measurement, the beam 70 will enter this cell 74 and activate it (FIGS. 15b and 15e). This photoelectric cell 74 is wired to reverse the electric motor and so the table 127 begins to rewind to its original position. A small shield 75 attached to the table 127 cuts off the beam 70 at a predetermined point and the second photoelectric cell 74 is deactivated (FIG. 15f). The table 127 stops and the apparatus is now ready to receive the next blank for measurement.

I claim:

1. Apparatus for measuring a conicoid surface to determine a defining parameter of the surface, the apparatus comprising:
    a first head member including first contact means for contacting the conicoid surface on a first circle, the first contact means defining a first datum plane related to the first circle;
    a second head member including second contact means for contacting the conicoid surface on a second circle concentric with the first circle, the second contact means defining a second datum plane related to the second circle, the first head member being moveable relative to the second head member in a direction which is substantially perpendicular to the first and second circles;
    a first linear gauge having a pointer which is moveable relative to the gauge for measuring displacement of the pointer relative to the gauge, the gauge being mounted to be fixed in operation relative to one of the head members and to present its pointer for contact with the vertex of the conicoid surface at a point concentric with said first and second circles; and
    a second linear gauge coupled between the first and second head members so as to measure relative displacement between the head members;
    whereby when the pointer of the first gauge and the first and second contact means are applied to the conicoid surface concentrically about the vertex thereof, displacement of the pointer is measurable by the first gauge to give a measurement of the perpendicular distance from the vertex of the conicoid surface to the datum plane of the head member to which the first linear gauge is fixedly mounted, and displacement of the first head member relative to the second head member is measurable by the second gauge to give a measurement of the difference between the perpendicular distance from the vertex of the conicoid surface to the first datum plane and the perpendicular distance from the vertex of the conicoid surface to the second datum plane.

2. Apparatus according to claim 1 in which the first contact means of the first head member comprise contacts for contacting the conicoid surface at at least three points spaced apart at substantially equal separations on said first circle, and the second contact means of the second head member comprise contacts for contacting the conicoid surface at at least three points spaced apart at substantially equal separations on the second circle.

3. Apparatus according to claim 2, wherein said contact means comprise point contacts, the first datum plane comprising a plane containing the said first circle on the conicoid surface, and the second datum plane comprising a plane containing said second circle on the conicoid surface.

4. Apparatus according to claim 2, wherein said contact means comprise spherical contacts; the first datum plane comprising a plane parallel to and slightly shifted from the plane containing the first circle, the first datum plane being defined as a plane containing the centers of the spherical contacts forming the first contact means; and the second datum plane comprising a plane parallel to and slightly shifted from the plane containing the second circle, the second datum plane being defined as a plane containing the centers of the spherical contacts forming the second contact means.

5. Apparatus according to claim 1, wherein the first head member comprises an inner head member mounted coaxially within an outer head member constituted by the second head member, the first contact circle on the conicoid surface being located concentrically within the second contact circle on the conicoid surface.

6. Apparatus according to claim 5, wherein the first linear gauge is mounted to be fixed in operation relative to the second, outer, head member.

7. Apparatus according to claim 1, wherein the second linear gauge has a pointer which is moveable relative to the gauge for measuring displacement of the pointer relative to the gauge, the second gauge being mounted to be fixed in operation relative to one of the head members and to present its pointer for contact with a surface of the other of the head members.

8. Apparatus according to claim 1 adapted for measuring various parameters of a lens having a front, convex surface and a back surface, the apparatus further comprising:
    third and fourth further linear gauges each having a pointer which is moveable relative to the gauge for measuring displacement of the pointer relative to the gauge,
    means for defining a reference plane, and
    support means for supporting a lens to be measured said lens having a perimeter plane defined as the plane containing the perimeter plane of the front convex surface of the lens, the support means being moveable relative to the reference plane to enable the perimeter plane defined by the lens to be arranged coincidentally with the reference plane,
    the third and fourth further gauge being mounted so that the pointers thereof may be coupled in use to front and back surfaces of the lens, whereby when said perimeter plane of the lens is brought into coincidence with said reference plane, the pointers are displaced from zero positions whereby the lens thickness may be calculated from a relationship of the displacements of the first and third gauges and total front surface sag of the lens may be calculated from a relationship of the displacements of the first and fourth gauges.

* * * * *